United States Patent [19]
Backderf

[15] 3,706,697
[45] Dec. 19, 1972

[54] EMULSION POLYMERIZATION OF ACRYLOXY-ALKYLSILANES WITH ALKYLACRYLIC ESTERS AND OTHER VINYL MONOMERS

[72] Inventor: Richard H. Backderf, West Richfield, Ohio

[73] Assignee: The B.F. Goodrich Company, New York, N.Y.

[22] Filed: Sept. 3, 1970

[21] Appl. No.: 69,431

[52] U.S. Cl. ............... 260/29.2 M, 117/155 UA, 117/161 UT, 117/161 ZA, 260/29.6 T, 260/29.6 TA, 260/29.7 T, 260/46.5 UA, 260/80.71, 260/827

[51] Int. Cl. .......................... C08f 11/04, D21h 1/40
[58] Field of Search .... 260/29.6 R, 29.2 M, 46.5 UA, 260/29.6 TA, 827 X, 80.71

[56] References Cited

UNITED STATES PATENTS

| | | | |
|---|---|---|---|
| 2,469,154 | 5/1949 | Bunnell et al. | 260/46.5 UA |
| 2,532,583 | 12/1950 | Tyran | 260/46.5 UA |
| 2,570,551 | 10/1951 | Hatcher et al. | 260/46.5 UA |
| 2,983,719 | 5/1961 | Cox et al. | 260/46.5 UA |
| 3,542,585 | 11/1970 | Heit | 260/827 |
| 3,637,899 | 1/1972 | Nametkin | 260/827 |
| 3,453,230 | 7/1969 | Plueddemann | 260/41 |
| 3,449,293 | 6/1969 | Burzynski et al. | 260/29.2 M |
| 3,203,919 | 8/1965 | Brachman | 260/29.6 R |

Primary Examiner—Donald J. Arnold
Assistant Examiner—Arthur H. Koeckert
Attorney—J. Hughes Powell, Jr. and Gerald A. Baracka

[57] ABSTRACT

Aqueous emulsion polymerization of acryloxyalkyl alkoxysilane, alkyl acrylic esters, and optionally other vinyl monomers produces copolymers curable at low temperatures. The silane may be introduced to the polymerization after a portion of the other monomers are polymerized. Heat curing improves the solvent resistance of cured as-cast films of the latex. Silanol curing catalysts enhance the cure rate. Paper coatings are comparison tested for wet and dry tensile. Exemplary is a latex of a polymer of 40.7 percent 2-ethylhexyl acrylate, 18.5 percent vinylidene chloride, 37.6 percent vinyl chloride and 3.2 percent gamma-methacryloxypropyl trimethoxysilane.

9 Claims, No Drawings

EMULSION POLYMERIZATION OF ACRYLOXYALKYLSILANES WITH ALKYLACRYLIC ESTERS AND OTHER VINYL MONOMERS

BACKGROUND OF THE INVENTION

Curable acrylate polymers are useful for many applications. Self-curable acrylates are particularly desirable since they do not require the addition of external curing agents but may be cured simply by heating. Only by curing can polymers be obtained which are useful for certain hard-service applications and which have the proper balance of physical properties. There is a need for monomers able to be polymerized with acrylate monomers and which contain the necessary reactivity for forming cross-links between polymer molecules so as to obtain a cured composition.

Certain organosilicon compounds are useful as monomers to provide reactivity for cross-linking. These organosilicon monomers, in addition to polymerizable unsaturation, generally contain a hydrolyzable group such as alkoxy, halogen and similar groups bonded to the silicon atom. Cross-linking is obtained with these monomers via a hydrolysis reaction with a subsequent condensation reaction. The organosilicon monomers are not without their disadvantages, however, since they often require high temperatures and long periods of heating to obtain satisfactory cures.

Heretofore it has not been known to employ vinylsilane monomers containing silicon-alkoxy groupings in emulsion polymerization systems due to the difficulty of polymerizing such monomers. These monomers are relatively slow to polymerize as compared to the acrylate monomers and one would expect the monomer to be hydrolyzed during emulsion polymerization so that even if the monomer was polymerized the reactivity necessary for subsequent cross-linking would be destroyed. (See for example U.S. Pat. No. 3,453,230).

It would be extremely advantageous to obtain self-curable polymers by the emulsion polymerization of one or more polymerizable organosilicon monomers containing SiOR reactivity with acrylic ester monomers. It would even be more advantageous if the resulting polymers are curable at low temperatures since many of these polymers discolor when exposed to elevated temperatures. A further advantage is that these polymers could be applied to heat sensitive substrates such as fine fabrics and then cured in place at low temperatures.

SUMMARY OF THE INVENTION

I have now discovered useful self-curable polymers obtained by the emulsion polymerization of acryloxyalkylsilane monomers with one or more acrylic ester monomers. It is completely unexpected that when these organosilicon monomers are polymerized in an aqueous emulsion that the SiOR groups are not hydrolyzed but retain their reactive function so that thy may serve as cross-linking sites for the polymer. The resulting polymers have a good balance of physical properties and are useful for a wide variety of applications. It is even more surprising that many of these polymers achieve a high degree of cure at room temperature or slightly above.

The acryloxyalkylalkoxysilane monomers are employed in the range between 0.5 and 10 percent by weight and more preferably between 1 to 6 percent by weight based on the total monomers. γ-Acryloxypropyltrimethoxysilane and γ-methacryloxypropyltrimethoxysilane are especially useful organosilicon monomers. One or more acrylic esters, preferably a lower alkyl ester of acrylic or methacrylic acid, will be polymerized in an amount from about 35 to about 99.5 percent by weight based on the total monomers. Additionally, one or more other polymerizable comonomers may be polymerized in amount up to about 64.5 percent by weight.

DETAILED DESCRIPTION

The curable acrylate polymers of the present invention contain about 0.5 to about 10 percent by weight of an acryloxyalkylsilane monomer having the structural formula

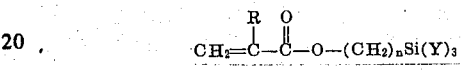

wherein R is hydrogen or a methyl group, n is an integer from 1 to 8 and Y is a hydroxy group or alkoxy group containing from one to eight carbon atoms. Excellent polymers and polymer latices are obtained when the acryloxyalkylalkoxysilane monomer is γ-methacryloxypropyltrimethoxysilane or γ-acryloxypropyltrimethoxysilane present in an amount from about 1 to 6 percent by weight based on the total monomers.

Polymerized with the organosilicon monomer is one or more acrylic ester monomers having the structural formula

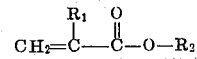

wherein $R_1$ is hydrogen or an alkyl radical containing from one to four carbon atoms and $R_2$ is a hydrocarbon radical containing from one to 12 carbon atoms such as alkyl, cycloalkyl, aryl, aralkyl, alkaryl and the like. Useful acrylic esters of the above type include methyl acrylate, ethyl acrylate, methyl methacrylate, ethyl methacrylate, 2-ethylhexyl acrylate, 2-ethylhexyl methacrylate, isobutyl methacrylate, isopropyl methacrylate, cyclohexyl acrylate, phenyl acrylate and the like. It is particularly useful for the present invention polymerizations to employ lower alkyl esters of acrylic or methacrylic acid, that is, where $R_1$ is hydrogen or methyl and $R_2$ is an alkyl radical containing from one to eight carbon atoms. Although ester substituents derived from hydrocarbon radicals are most useful, other functionally substituted ester substituents may be employed. For example, glycidyl acrylate, glycidyl methacrylate and ethoxyethyl acrylate are useful monomers.

The amount of acrylic ester may be present over a wide range from about 35 to about 99.5 percent by weight based on the total monomers. A more preferred composition will contain from about 55 to 90 percent by weight of the acrylic ester.

In addition to the acryloxyalkylalkoxysilane and the acrylic ester one or more other polymerizable comonomers may be included in the polymerization. Accordingly, numerous polymer compositions are possible and within the scope of the present invention. Polymerizable comonomers which may be included in the present invention include: conjugated dienes such as butadiene, isoprene, piperylene; α-olefins such as ethylene, propylene; isobutylene and 4-methylpentene-1; vinyl esters such as vinyl acetate; vinyl halide and vinylidene halide monomers such as vinyl chloride, vinyl bromide and vinylidene chloride; vinyl aromatics such as styrene, α-methyl styrene and vinyl toluene; alkyl vinyl ethers such as methyl vinyl ether and isobutyl vinyl ether; α,β-olefinically unsaturated carboxylic acids such as acrylic acid and methacrylic acids; amides of α,β-olefinically unsaturated carboxylic acids such as acrylamide, methacrylamide and diacetone acrylamide; N-alkylol amides of α,β-olefinically carboxylic acids such as N-methylol acrylamide and N-methylol methacrylamide; N-alkoxyalkyl amides of α,β-olefinically unsaturated carboxylic acids such as N-methoxymethyl acrylamide and N-butoxymethyl methacrylamide; α,β-olefinically unsaturated nitriles such as acrylonitrile and methacrylonitrile; cyanoalkyl acrylates such as α-cyanomethyl acrylate; bis(β-haloalkyl) alkenyl phosphonates such as bis(β-chloroethyl)vinyl phosphonate; polyfunctional monomers such as trimethylolpropane triacrylate, methylenebisacrylamide, divinylbenzene, ethyleneglycol dimethacrylate, diethyleneglycol diacrylate and allyl pentaerythritol; and the like.

Any of the comonomers mentioned may be polymerized with acrylic ester and organosilicon monomers in accordance with the present invention in an amount up to about 64.5 percent by weight based on the total monomers. There are, however, especially useful comonomers including vinyl acetate, styrene and α-methyl styrene, vinyl chloride and vinylidene chloride, acrylonitrile and methacrylonitrile, and acrylamide and methacrylamide since they are readily polymerized to give polymers having excellent physical properties and a wide range of useful applications. Excellent results are obtained when one or more of these comonomers are present in an amount from about 9.5 to 44.5 percent by weight.

Polymerization of the organosilicon monomer may be conducted in accordance with known emulsion polymerization techniques. A great deal of flexibility with respect to the emulsifiers and initiators employed, the charging procedures and the polymerization conditions is permitted in conducting the polymerizations. The polymerizations will generally be conducted at temperatures ranging from about 5°C. to about 100°C. While the pH at which the polymerization is conducted is not a critical feature it is preferable that it be maintained between about 6 and 7 so that the acryloxyalkylalkoxysilane monomer is not prematurely hydrolyzed. In this way maximum reactivity for subsequent cross-linking of the polymers is assured. The polymer latices may contain up to as much as 65 percent by weight total solids.

The polymers are prepared in an aqueous medium which may be free of emulsifier, however, one or more emulsifiers are generally employed in the polymerization so that stable latices, essentially free of coagulum are obtained. In general, any of the anionic and nonionic type emulsifiers may be employed. Latices having excellent stability are obtained with these emulsifiers. Useful anionic emulsifiers include: alkali metal or ammonium salts of the sulfates of alcohols having from eight to 18 carbon atoms; alkali metal or ammonium salts of sulfonated paraffin or petroleum oils; alkali metal or ammonium salts of aromatic sulfonic acids; alkali metal and ammonium salts of sulfonates of dicarboxylic esters; alkali metal soaps of rosin acids; and the like. Useful nonionic emulsifiers include octyl- and nonylphenoxypoly(ethyleneoxy)ethanol and octylphenoxypolyethoxyethanol. When an emulsifier is used it may be present in an amount up to about 10 parts/100 parts total monomers and more preferably from about 3 to 6 parts/100 parts. It is often advantageous to employ a mixture of emulsifiers which may be selected from different emulsifier groups. The emulsifier may be charged completely at the outset of the polymerization or a portion charged at the outset and additional emulsifier proportioned or added in increments throughout the polymerization.

A polymerization catalyst will generally be employed. Any of the known polymerization catalysts capable of initiating free radical polymerizations may be used. Initiators such as the various peroxygen compounds including persulfates, peroxides, hydroperoxides, azo compounds and the like are useful. The water soluble peroxygen compounds such as hydrogen peroxide and sodium, potassium or ammonium persulfate employed by themselves or in activated redox system are particularly advantageous. The amount of initiator will generally range between about 0.1 to 3 percent by weight based on the total monomers with the initiator being charged entirely at the outset of the polymerization or incrementally or proportionately throughout the run.

The monomers to be polymerized may be charged in accordance with known copolymerization techniques. It is also possible to charge one or more of the monomers by incremental addition or proportioning at a point subsequent to the initial charging so that the latter added monomer(s) are overpolymerized or grafted onto the base polymer. It is also possible and often advantageous to employ pre-emulsification and seeding techniques which are well known to the art. With such techniques, an emulsion of the monomers to be polymerized are proportioned to the reactor after a small amount (generally 15 percent or less) of the monomer emulsion has already been polymerized.

Additives and polymerization modifiers may also be included and are often desirable. For example, the use of mercaptan modifiers such as the primary, secondary and tertiary aliphatic mercaptans may be useful to lower the polymer viscosity. Other substances which may be incorporated into the reaction medium include buffers, electrolyte salts, carbon black, silica and the like. The polymerization may be terminated by the addition of a polymerization inhibitor such as hydroquinone or phenyl-β-naphthalamine. The termination may be after complete monomer conversion or before conversion of the monomers is completed.

The polymers of the present invention are useful in the latex form or in the coagulated form. The latex may be used per se, diluted to a lower solids content or blended with polymer dispersions or latices of other rubbery or plastic materials. It is often advantageous to add thickeners or bodying agents to the latex for improvement of flow properties for subsequent coating and dipping operations. Useful applications of the polymer latex include impregnating and coating papers or synthetic or natural fabrics, adhesives and binders, and metal and abrasion coatings.

The polymers are useful as foams and as compositions suitable as for gaskets, footwear, flooring and may be obtained from the latex by coagulation with conventional alcohol or salt-acid coagulants. They may also be isolated by freeze coagulation. The polymers may be compounded with fillers, stabilizers, plasticizing agents and the like in accordance with generally established procedures.

The polymers of this invention are self-curable, that is, they are curable upon exposure to heat without the addition of curing agents by virtue of the SiOR reactivity. It may, however, be advantageous with certain polymer compositions to enhance the rate of cure by including one or more curing catalysts. Any compound capable of catalyzing the condensation of silanol groups will be useful to accelerate the cure of the present polymer compositions. Such catalysts include: alkali phenoxides and their derivatives; primary, secondary and tertiary amines; metal carboxylates; and organic titanium compounds.

The following Examples serve to illustrate the invention more fully. In these Examples parts and percentages are on a weight basis unless otherwise indicated.

EXAMPLE I

An emulsion of 600 grams of vinyl chloride, 20 grams of 2-ethylhexyl acrylate, 10 grams of vinylidene chloride, 1270 grams water and 6 grams of an alkyl aryl sodium sulfonate emulsifier was prepared in a 2-liter stainless steel reactor. The emulsion additionally contained 0.5 gram sodium bicarbonate and 3 grams of potassium persulfate initiator. After heating the reactor and its contents to 55°C. an additional 18 grams of water was charged to the polymerizer so that the pressure in the vessel was greater than the vapor pressure of the vinyl chloride. As the polymerization proceeded a monomer solution comprised of 62 percent 2-ethylhexyl acrylate, 28.4 percent vinylidene chloride, 5 percent γ-methacryloxypropyltrimethoxysilane and 4 percent nonylphenoxypoly(ethyleneoxy)ethanol emulsifier and a separate aqueous emulsifier solution (31.4 percent alkyl aryl sodium sulfonate) were metered at rates of about 51.2 grams/hour and 5.3 grams/hour, respectively, over an 8 hour period. Meanwhile about 56 grams/hour of the latex-monomer mixture was bled from the reactor. 1932 Grams of latex (referred to as Latex A) containing 33.9 percent total solids was obtained. The latex had excellent stability and was essentially free of coagulum. The overall composition of the polymer was 40.7 percent 2-ethylhexyl acrylate, 18.5 percent vinylidene chloride, 37.6 percent vinyl chloride and 3.2 percent γ-methacryloxypropyltrimethoxysilane.

Films were cast from the above latex on glass plates at 25°C. Film samples (0.5 × 2 cm) were cured at room temperature for 16 hours and soaked in trichloroethylene at 25°C. for 16 hours. The linear swell was measured on the film and found to be 53 percent. The linear swell of a film cast from an identical polymer latex composition (referred to as Control Latex), except that the γ-methacryloxypropyltrimethoxysilane was excluded, could not be measured after it was cured at room temperature for the same period since the film disintegrated in the solvent. When the γ-methacryloxypropyltrimethoxysilane-containing polymer film was cured at 275°F. for 9 minutes the linear swell in trichloroethylene showed an even greater improvement over that obtained with the room temperature cure.

Ten mil bleached kraft paper having a minimum fiber-fiber contact was saturated with the above latices (Latex A and Control) which were diluted to about 20 percent total solids. The papers were dipped in the latex for about 5 seconds, drip-dried for 24 hours at room temperature and the paper samples cured. Polymer pick-up on the papers were essentially the same with both Latex A and the Control Latex. Wet and dry tensile strengths were measured for the cured paper samples (0.5 × 8 inch) with an Instron Tensile Tester having a pull rate of 12 in. per minute in accordance with TAPPI Procedure T–404. In all instances, the dry tensiles of the papers saturated with Latex A containing the γ-methacryloxypropyltrimethoxysilane were superior to the dry tensile values obtained with the papers saturated with the Control latex without the γ-methacryloxypropyltrimethoxysilane. The difference in wet tensile values of the saturated papers was even more significant as is evident from the following:

| | Wet Tensile (pounds/inch) | |
|---|---|---|
| | Paper saturated with Latex A | Paper saturated with Control Latex |
| 10 min. cure at 212°F. | 11 | 4 |
| 5 min. cure at 275°F. | 15 | 5 |
| 3 min. cure at 325°F. | 21 | 7 |

EXAMPLE II

A polymer latex was prepared employing the same polymerization procedure described in Example I except that the polymerization medium was highly buffered by the use of phosphates to a pH of 6.9. The overall composition of the polymer was 40 percent vinyl chloride, 39 percent 2-ethylhexyl acrylate, 18 percent vinylidene chloride and 3 percent γ-methacryloxypropyltrimethoxysilane. A film was cast from the latex and cured for 1 hour at 85°F. in a 1 percent aqueous ammonia. The film was then placed in tetrahydrofuran at room temperature for 18 hours and the linear swell found to be 115 percent. By comparison, the linear swell of an uncured sample was 175 percent.

10 Mil paper was saturated with the above latex and a Control latex which did not contain any γ-methacryloxypropyltrimethoxysilane polymerized. The dry paper samples were cured for 3 minutes at 325°F. The results were as follows:

| | Paper saturated with latex containing γ-methacryloxypropyltrimethoxysilane | Paper saturated with Control latex |
|---|---|---|
| Dry Paper Tensile (lbs/inch) | 64 | 58 |
| Wet Paper Tensile (lbs/inch) | 27 | 8 |
| Solvent Paper Tensile (lbs/inch) | 25 | 20 |
| Reflectance (%) | 74 | 63 |
| Color | White | Dark brown |

EXAMPLES III–IV

A series of three batch emulsion polymerizations were conducted. The polymerization recipes were as follows:

|  | Ex. III | Ex. IV | Control |
|---|---|---|---|
| Monomers (grams): |  |  |  |
| Ethyl acrylate | 100 | 95 | 100 |
| γ-Methacryloxypropyltrimethoxy-silane |  | 5 | 5 |
| Water (grams) | 200 | 185 | 185 |
| Emulsifier (grams): |  |  |  |
| Dodecylbenzenesodium sulfonate | 3 |  |  |
| Sodium salt of laurylsulfate (20%) |  | 12 | 12 |
| Polymerized sodium salts of alkyl naphthalene sulfonic acids (10%) |  | 9 | 9 |
| Initiator (grams): |  |  |  |
| p-Menthane hydroperoxide (50%) |  | 0.2 | 0.2 |
| Potassium persulfate | 0.1 |  |  |
| Sodium and ferric salt of ethylene-diaminetetraacidic acid (0.25%) |  | 8.3 | 8.3 |
| Reducing Agent (grams): |  |  |  |
| Sodium formaldehyde sulfoxylate (1%) |  | 10 | 10 |
| Potassium pyrosulfite | 0.1 |  |  |
| Buffer (grams): |  |  |  |
| Tribasic potassium phosphate | 0.5 |  |  |

The resulting latices were used to saturate 10 mil paper and the saturated papers cured at 225°F., 275°F., 325°F. Wet tensile and solvent tensile strengths were measured. The tensile data obtained were as follows:

|  | Paper saturated with latex III | Paper saturated with latex IV | Paper saturated with control latex |
|---|---|---|---|
| 10 min. cure at 225°F.: |  |  |  |
| Wet tensile | 8.4 | 9.2 | 5.1 |
| Solvent tensile | 23.7 | 22.3 | 21.4 |
| 5 min. cure at 275°F.: |  |  |  |
| Wet tensile | 9.1 | 10.4 | 5.4 |
| Solvent tensile | 27.6 | 21.4 | 18.7 |
| 3 min. cure at 325°F.: |  |  |  |
| Wet tensile | 10.4 | 14.1 | 6.4 |
| Solvent tensile | 29.3 | 26.7 | 17.0 |

The data demonstrate the superiority of the γ-methacryloxypropyltrimethoxysilane-containing latices and the ability to obtain improved paper properties at cure temperatures as low as 225°F.

EXAMPLE V

In order to demonstrate the versatility of the present invention a polymerization was conducted wherein the organosilicon monomer was overpolymerized on the outer shell of a latex particle. The core of the latex particle contained a polyfunctional comonomer polymerized with vinyl chloride, vinylidene chloride and 2-ethylhexyl acrylate. The polymerization procedures employed were the same as described in the previous examples except that the proportioning of the organosilicon monomer was delayed until approximately 80 percent of the monomers making up the core had been polymerized. The overall polymer composition was as follows:

| Vinyl chloride | 38% |
|---|---|
| 2-Ethylhexyl acrylate | 41% |
| Vinylidene chloride | 18% |
| Trimethylolpropane triacrylate | 2% |
| γ-Methacryloxypropyltrimethoxy-silane | 0.3% |

With papers saturated with the overpolymer latex, tensile values indicated that even when the polymers were cured at temperatures down to as low as room temperature, acceptable paper properties were obtained.

In addition to curable acrylate polymers, it is also possible to prepare useful curable copolymer compositions in emulsion which contain the acryloxyalkylalkoxysilane monomer. Such copolymer compositions will typically be rubbery compositions derived from conjugated dienes such as butadiene, isoprene, chloroprene, piperylene and the like. Butadiene-derived polymers will generally contain up to about 70 percent by weight styrene or up to about 50 percent by weight acrylonitrile copolymerized. Other self-curable polymers are possible in accordance with the teachings of the present invention.

I claim:

1. A process for the preparation of self-curable solid acrylate polymers comprising copolymerizing (A) from about 55 to about 90 percent by weight of an acrylic ester of the formula

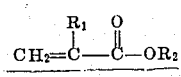

wherein $R_1$ is hydrogen or methyl and $R_2$ is an alkyl radical containing one to eight carbon atoms, (B) from about 0.5 to about 6 percent by weight of γ-methacryloxypropyltrimethoxy silane or γ-acryloxypropyltrimethoxy silane, and (C) from about 9.5 to 44.5 percent by weight of another copolymerizable monomer selected from the group consisting of vinyl acetate, styrene, α-methyl styrene, vinyl chloride, vinylidene chloride, acrylonitrile, methacrylonitrile, acrylamide and methacrylamide, all based on the total weight of monomers charged, in aqueous emulsion at a temperature of from about 5° to 100°C. with a free radical polymerization catalyst.

2. A process of claim 1 wherein the alkyl acrylate is 2-ethylhexyl acrylate and (C) is vinylidene chloride.

3. A process of claim 1 wherein an emulsifying agent is used in a level to about 10 parts per 100 parts of monomer and the pH is about 6 to 7.

4. A process of claim 3 wherein about 10 percent of the total acrylic ester monomer (A) and about 80 percent of the total copolymerizable monomer (C) are first polymerized to a level of from about 15 percent to about 80 percent conversion based on the amount of monomers charged before charging the acryloxyalkylalkoxy silane monomer and the remainder of the acrylic ester and copolymerizable monomer to the polymerization reactor.

5. A process of claim 4 wherein the emulsifying agent is an anionic emulsifier used in the level from about 3 to about 6 parts by weight based on 100 parts by weight of monomer.

6. A process of claim 5 wherein the emulsion is buffered to maintain a pH of about 7 using tribasic potassium phosphate.

7. The process of claim 4 wherein the acrylic ester (A) is ethyl acrylate.

8. The process of claim 4 wherein (A) is 2-ethylhexyl acrylate and (C) is vinyl chloride and vinylidene chloride.

9. The process of claim 8 wherein there is additionally employed about 2 percent trimethylol propane triacrylate.

* * * * *